Aug. 21, 1962   A. J. WILLIAMS, JR   3,050,675
ELECTRICAL CONVERTER
Filed Oct. 1, 1958   3 Sheets-Sheet 3

3,050,675
Patented Aug. 21, 1962

3,050,675
ELECTRICAL CONVERTER
Albert J. Williams, Jr., Philadelphia, Pa., assignor to Leeds and Northrup Company, Philadelphia, Pa., a corporation of Pennsylvania
Filed Oct. 1, 1958, Ser. No. 764,705
10 Claims. (Cl. 321—45)

This invention relates to converters of the type utilized for converting alternating current to direct current and for converting direct current to alternating current, and has for an object the provision of a transistor type of full-wave converter in which there has been eliminated from the associated external circuits the effects of any voltage offset or current offset present in the transistors.

It has heretofore been proposed to utilize transistors as the switching elements in full-wave converters. Transistors in converter applications are particularly useful since they may be operated at high speed and within practical limits at any desired selected frequency. A difficulty, however, in the use of transistors in converter circuits arises from the fact that a transistor when conductive acts as a voltage source. Thus, when such transistors have been made conductive in the absence of an applied signal to one of the external circuits, there has been developed in the other external circuit a voltage due solely to the aforesaid action of the transistor.

In carrying out the present invention in one form thereof, first and second transistors are included in adjacent arms of a bridge and are so associated with impedance elements in the opposite arms and with respect to external direct current and alternating current circuits that any effects of offset, voltage or current give rise to alternating current voltages at the external direct current circuit and give rise to direct current voltages at the external alternating current circuit. Direct current voltages at the external alternating current circuit are readily eliminated and so are the alternating current voltages appearing at the external direct current circuit. Accordingly, the full-wave converter may be utilized for modulating and demodulating applied signals without introducing error due to the action of the transistors as voltage sources when conductive and as current sources when non-conductive.

For a detailed discussion of the invention in connection with typical embodiments thereof, reference is to be had to the following description taken in conjunction with the accompanying drawings, in which.

Figure 1:
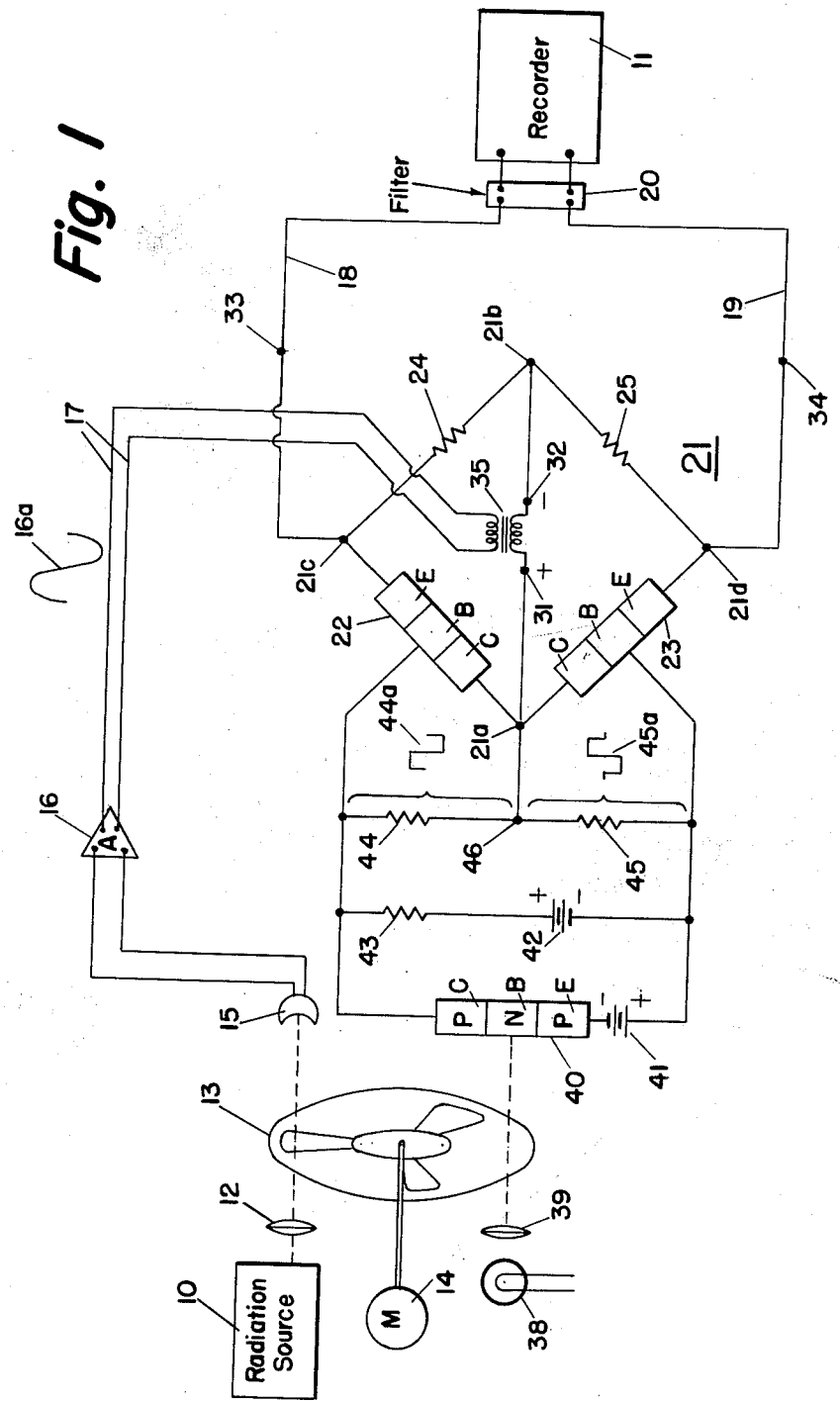
FIG. 1 is a wiring diagram schematically illustrating one embodiment of the invention.

Referring to FIG. 1, the invention in one form has been shown as part of a system for the measurement of radiation from a source 10. The measurement may be read on suitable exhibiting means such as a recorder 11 including a scale and an index therefor. More particularly, radiation from source 10 is directed by a lens 12 through the openings in a chopper-disc 13 driven by a motor 14, the radiation being directed onto a detector or photosensitive device 15. The interrupted beam of radiation on detector 15 applies to an amplifier 16 an input signal. The amplifier develops across its output circuit 17 an alternating current of amplitude dependent upon the intensity of radiation. In order to measure the intensity of radiation, it is desired to demodulate the alternating current output signal from output circuit 17 to convert it to a direct current output signal developed between conductors 18 and 19 forming an input circuit to the recorder 11 and which input circuit may include a filter 20.

The demodulator 21 to which the present invention is particularly directed comprises transistors 22 and 23 forming two arms of a Wheatstone bridge, resistors 24 and 25 forming the remaining arms thereof. The emitters, the bases, and the collectors of the transistors 22 and 23 have been identified respectively by the letters E, B and C. This convention has been used in FIG. 1 and in the subsequent figures for the reason that the transistors 22 and 23 may be of any of the available types, as for example, of the PNP or NPN type. Preferably, the transistors are matched pairs, matched in manner hereinafter to be explained. Transistors of the germanium type have both voltage and current offset. Transistors of the silicon type have voltage offset but negligible current offset. Current offset and voltage offset produce in the demodulator 21 the following action: in the absence of any signal by way of an input transformer 35 to the alternating current terminals 31 and 32, there will be an undesired output from the demodulator 21.

In order to eliminate such undesired output from the demodulator 21 due to the results of offset, both current and voltage, the present circuit is arranged so that the effects of both current and voltage offsets do not affect the accuracy or precision of measurement. This result is accomplished not by eliminating within the bridge the effect of the two offsets, but rather to eliminate their effects upon the external circuits.

The circuit as a whole is arranged so that signals due solely to offset appear in the form of alternating current at the direct current terminals 33, 34 and as direct current at the alternating current terminals 31, 32. By eliminating the appearance of undesired direct current signals at the direct current terminals 33, 34 and by eliminating the appearance of undesired alternating current signals at the alternating current terminals 31, 32, the demodulator 21 functions to produce an output unaffected by the presence of voltage offset and of current offset inherent in the characteristics of transistors 22 and 23.

The chopper wheel 13 is utilized for the development of the control signals. Thus, a source 38 directs by way of lens 39 radiation to a photosensitive transistor 40, such as of the G.T. 2N469 type. This photosensitive transistor 40 is turned on each time a beam of radiation is directed onto its base. There is associated with photosensitive transistor 40 a battery 41 and a second battery 42 in series with a resistor 43. The output circuit includes resistors 44 and 45. At a point 46 common to both resistors, a connection extends to a point 21a of the bridge common to the two transistors 22 and 23. A connection from the other side of resistor 44 extends to the base of transistor 22. A connection from the other side of resistor 45 extends to the base of transistor 23. The battery 41 in one modification had a value of 1½ volts, the battery 42 a value of 4½ volts. The latter battery in conjunction with resistor 43, of the order of 2,000 ohms, serves in conjunction with resistors 44 and 45, each of 1,000 ohms, to center the square-wave output voltage. That output voltage as appearing across resistor 44 has been illustrated at 44a as comprising a positive-going pulse followed by a negative-going pulse. At the same time there appears across resistor 45 a square-wave 45a having with respect to point 46 a negative-going pulse followed by a positive-going pulse.

The foregoing is a correct representation of the output voltage since with transistor 40 conductive, current will flow upwardly through the branch circuit including resistors 45 and 44. The base of transistor 23 will be made more positive than the collector. Because of the presence of resistor 44, the base of transistor 22 will be less positive than the collector. Accordingly, for transistors 22 and 23 of the same type, one will be conductive and the other non-conductive. If it be assumed (1) that transistor 22 is of the PNP type so that with the base less positive than the collector it is conductive, and (2) that the transistor 23 is of the same type so that with the base more positive than the collector it will be non-conductive, then in the absence of an input signal transistor 22 will in the demodulator be representative of a voltage source. Since the control voltage which has made transistor 22 conductive has made the collector more positive than the base, the direction of flow of the "turn on" current will be from collector to base. The effect of offset, due to the aforesaid current flow from collector to base, in the transistor 22 can be considered as due to a coupling-resistor-effect between the switching and switched circuits. Thus, the potential difference across such coupling resistor can be considered as producing a current flow in the switched circuit, as from the collector to point 21a, through the transformer secondary winding, and by way of resistor 24 to the other side of transistor 22. For the next half-cycle of the square-wave control voltage, transistor 22 will be made non-conductive and transistor 23 conductive. Current will, accordingly, flow due to the potential difference arising from the "turn on" current and will be in the same direction through the secondary winding of transformer 35 with return to transistor 23 by way of resistor 25. Thus, for successive half-cycles of the square-wave control voltage, the current flow between the alternating current terminals 31 and 32 will be from left to right, namely, from terminal 31 to terminal 32. Thus, the aforesaid requirement that current flow due to voltage offset results in a unidirectional or direct current at the alternating current terminals 31 and 32 of the demodulator 21 has been met.

An examination will now be made of the voltages developed under the foregoing assumed operations between direct current terminals 33 and 34. Current flow through transistor 22 develops a voltage between terminals 21c and 21d of the bridge with terminal 33 negative relative to terminal 34 for the assumed direction of current flow. When transistor 23 is rendered conductive and transistor 22 non-conductive, direct current terminal 34 is made negative relative to direct current terminal 33. With the terminals 33 and 34 alternately being first positive and then negative, it will be seen that the voltage is alternating in character, that is, first in one direction and then in the opposite direction and that this alternating current voltage is developed across the direct current terminals 33 and 34. Such an alternating current voltage has no effect upon recorder 11. It has no effect because the input circuit includes a filter which by-passes or eliminates from the recorder the alternating current developed between terminals 33 and 34. The effect of such alternating current, which may be of a relatively low frequency, can also be eliminated in the recorder itself which, by reason of the inertia of its parts, will not respond to low frequency alternating current. Thus, for example, if the chopper-disc 13 be rotating at a speed to produce an alternating current of a frequency of the order of 90–100 cycles, recorders for direct current signals would not respond thereto.

There has thus far been explained the manner in which there has been eliminated the effect of voltage offset in the response of recorder 11. The voltage offset appears by reason of the fact that when a transistor has been rendered conductive, it can for purposes of analysis be replaced by a voltage source. Similarly, when a transistor is rendered non-conductive, it may for purposes of circuit analysis be replaced by a current source. Thus when transistor 22 is rendered conductive and transistor 23 non-conductive, the latter is to be considered as a current source. As a current source under the assumed conditions, current will flow through transistor 23, as for example, from the emitter, externally, to the collector, as by way of resistor 25 and the secondary winding of the transformer 35. Such current flow will make terminal 34 positive relative to terminal 33. When transistor 22 is non-conductive and transistor 23 conductive, terminal 33 becomes positive relative to terminal 34. Accordingly, an alternating current potential, due solely to current offset, is developed across the direct current terminals 33 and 34 of demodulator 21. In the same manner as explained above for potential offset, the direct current potential due to current offset appears between alternating current terminals 31 and 32 of demodulator 21. Thus for current offset and voltage offset, the requirements above mentioned have been met, namely, neither produces effects at the external circuits of signal-modifying character.

Synchronism between the control voltages 44a and 45a and the alternating current applied to the demodulator 21 by way of conductor 17 and transformer 35 is achieved by utilizing the same disc for interrupting the radiation from source 10 and from the lamp or other source 38 for the photosensitive transistor 40. Thus with an output signal 16a characterized by a positive half-cycle followed by a negative half-cycle and with control voltages 44a and 45a as illustrated, it will be assumed that the positive half-cycle of signal 16a will make terminal 31 positive relative to terminal 32. Current will flow by way of conductive transistor 23 to direct current terminal 34 with return by way of the filter 20, terminal 33, resistor 24 and secondary winding of secondary transformer 35.

When the negative half-cycle of input signal 16a is applied, terminal 32 will be made positive relative to terminal 31 and current will flow through resistor 25 to terminal 34, through the filter 20 and will return by way of terminal 33 and transistor 22 which has previously been rendered conductive. It is to be noted that current flow was traced through transistor 23 from collector to emitter and through transistor 22 from emitter to collector. Thus, advantage is taken of the property of transistors of conducting current in either direction when rendered conductive. It is this fact, that transistors do conduct in either direction when rendered conductive by the control voltage, that makes them ideally suited for low-power switching applications without limitation as to whether the current in character be alternating or direct. The effects of current offset and voltage offset of transistors 22 and 23 have been effectively nullified in a system having general utility for applications of many kinds.

The foregoing requirements of the present invention may be summarized: The two transistors 22 and 23 feed the external direct current circuit connected to the direct current terminals 33 and 34 sequentially in opposite sense. Because of this fact, the offsets of the transistors are opposed. With the offsets of equal magnitude, the current flow, due to current offset, in the direct current circuit is of a strictly alternating character, i.e., the magnitude of the potential in one direction is equal and opposite to the magnitude of the potential in the opposite direction. Accordingly, there is no direct current component injected into the direct current circuit. Analogously, the external alternating current circuit is subject to a direct current potential due first to one transistor and then the other transistor, but since these potentials are always equal and of the same polarity, no alternating current component is introduced into the alternating current circuit.

The present invention may be further characterized as follows: when the transistors produce around the bridge effects of offset in given directions, which may not be the same, the external circuits are always connected across the two diagonals so that the direct current circuit is always connected to the common connection to the transistors when the effects of offset are in the same direction; when the effects are of opposite direction around the bridge, the alternating current circuit is connected to the diagonal which includes the common connection to the transistors. The foregoing connections, in accordance with the present invention, make possible the use of the present invention with transistors of differing types and of differing materials.

The ability of transistors, at low-level operation, to conduct with equal facility in both directions prevents the conversion of random noise into zero offset. If, for example, it be assumed that there be a noise signal on input conductor 17, that signal will be applied to transistor 22 during the time it is conductive, and current will flow in either direction through that transistor depending upon the instantaneous polarity of the random noise signal. Since current can flow through transistor 22 in either direction, the random noise present as an alternating current signal, while appearing at the external direct current terminals 33 and 34, will have no effect upon the recorder 11: it will be eliminated as in the case of the alternating current potential applied to terminals 33 and 34 due to the current and voltage offsets above described. The action will be the same when transistor 23 is conductive and transistor 22 non-conductive. Thus, the effect of noise has been eliminated from recorder 11 whether appearing in the absence of an input signal or when superimposed on input signal 16a.

Figure 2:
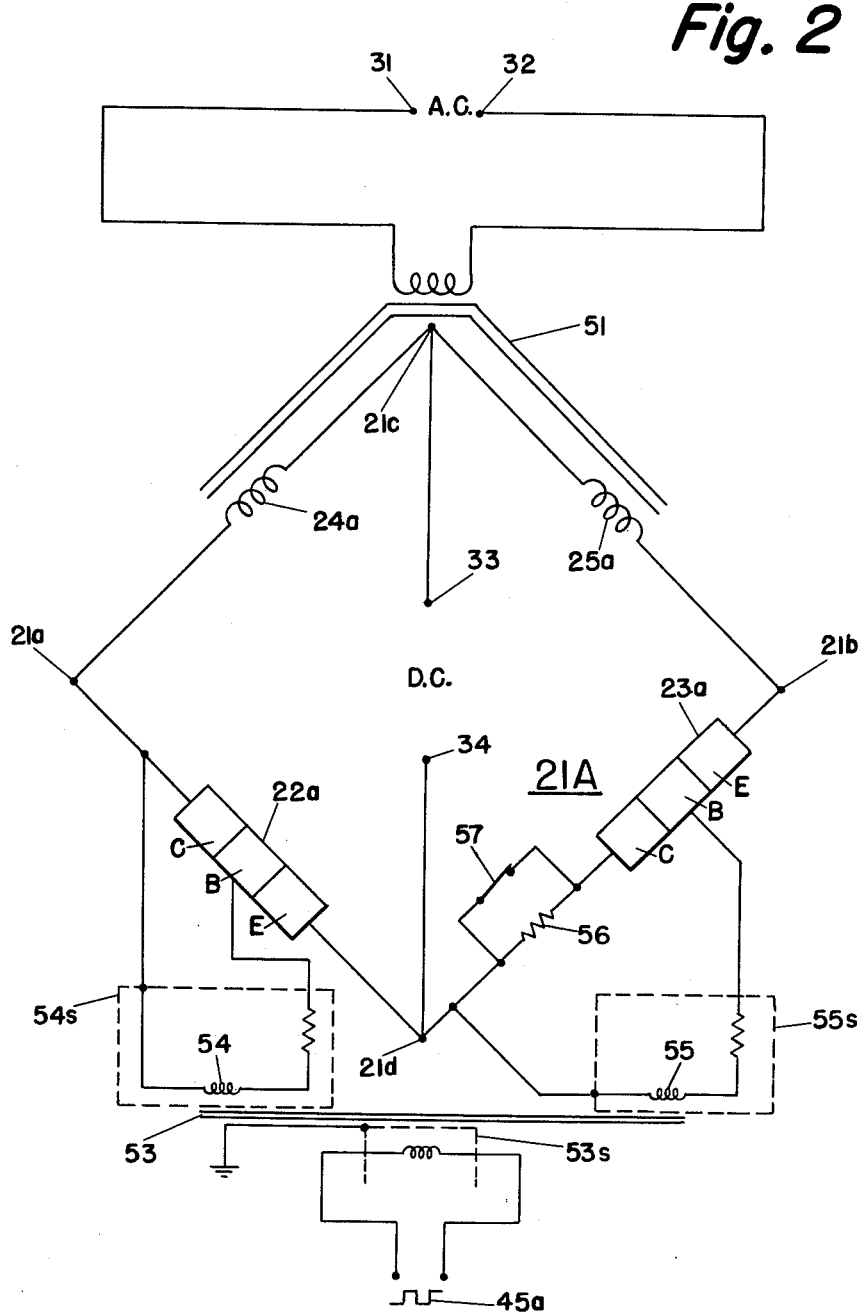
FIG. 2 is a wiring diagram schematically illustrating a second modification of the invention.

With the above understanding of the principles of the invention, reference may now be had to FIG. 2 where there has been illustrated a converter 21A including the terminals 31 and 32 of an external alternating current circuit which by coupling transformer 51 is effectively connected across the diagonal 21a, 21b of the converter. The windings 24a, 25a of transformer 51 form the impedance elements connected in adjacent arms of the bridge. The transistors 22a and 23a are connected in the opposite arms of the bridge. The control circuits for the transistors 22a, 23a are formed by the secondary windings of transformer 53, the primary winding being energized from a suitable alternating current source of supply which in every preferred form of the invention is of the square-wave type, and such as illustrated by input signals 45a.

Preferably, the control transformer 53, with secondary windings 54 and 55, is of the double-shielded type, that is to say, each of the secondary windings is provided with separate shields as indicated by the broken lines at 54s, 55s and respectively connected to the collector electrodes of transistors 22a and 23a. Similarly, the primary winding is provided with a grounded shield 53s.

In order that the two transistors 22a and 23a, in respect to the effects due to current offset and voltage offset, shall feed sequentially in opposite sense the external direct current circuit extending from terminals 33 and 34, the transistors 22a and 23a, of the same type, are oppositely or asymmetrically disposed in the two arms of the bridge. The emitter of transistor 22a is connected to point 21d of the bridge, while the collector of transistor 23a is connected to the same point 21d. By reason of this connection, the effects of offset of the transistors 22a and 23a will be in the same direction around the bridge. Accordingly, the external direct current circuit extends between points 21c and 21d of the bridge, the latter point, of course, being common to the two transistors.

In the absence of a signal on either of the external circuits and assuming that transistor 22a is of the PNP type and is conductive, current will flow by way of transistor 22a to point 21a due to the voltage offset of transistor 22a. This will make the external terminal 33 positive. When transistor 22a is rendered non-conductive and transistor 23a (also assumed to be of the PNP type) is conductive, current will flow through that transistor 23a to point 21d, due to the voltage offset of transistor 23a, thus making the external terminal 34 positive relative to terminal 33. Thus, the action in the converter 21A is identical with that described in FIG. 1 in that voltage offset produces an alternating current voltage across the external direct current circuit. The effect of current offset is likewise the same as in FIG. 1 and the detailed description thereof need not be here repeated.

It may here be observed that if transistors 22a and 23a (and corresponding transistors of FIG. 1) be of the silicon type, current offset will be of a low order of magnitude. Either silicon or germanium transistors may be utilized in either of the modifications, and the transistors may be either of the PNP or NPN types. If the respective transistors are matching in the sense that the magnitudes of the voltage and current offsets of one are equal to those of the other, the correction will be perfect. Accordingly, the transistors utilized in the converter will be checked for the magnitude of voltage and current offsets and matching or closely matching, pairs utilized.

Where matching pairs of silicon transistors are not conveniently available, a resistor 56 (as explained and claimed in copending application Serial No. 764,585, filed October 1, 1958, now Patent No. 3,017,560, by Norman E. Polster, a co-employee of mine and assigned to the same assignee as the present invention) may be included in circuit with the silicon transistor having the lesser offset. As shown in FIG. 2, resistor 56 may be included in the circuit by opening the switch 57. For transistors, one of which had a voltage offset of 800 microvolts and the other an offset of 500 microvolts, a resistor of 0.8 ohm in the collector lead of the transistor having the 500 microvolts, offset will be effective to bring the two transistors into matching relationship for complete elimination on the converter of the effects of offset. The resistor material will be selected for a temperature coefficient of resistance which maintains said matching relationship over a wide temperature range, as for example, from 13° C. to 64° C. For example, a portion of the 0.8 ohm resistor may be composed of copper for the aforesaid silicon transistors with the remainder manganin.

Figure 3:
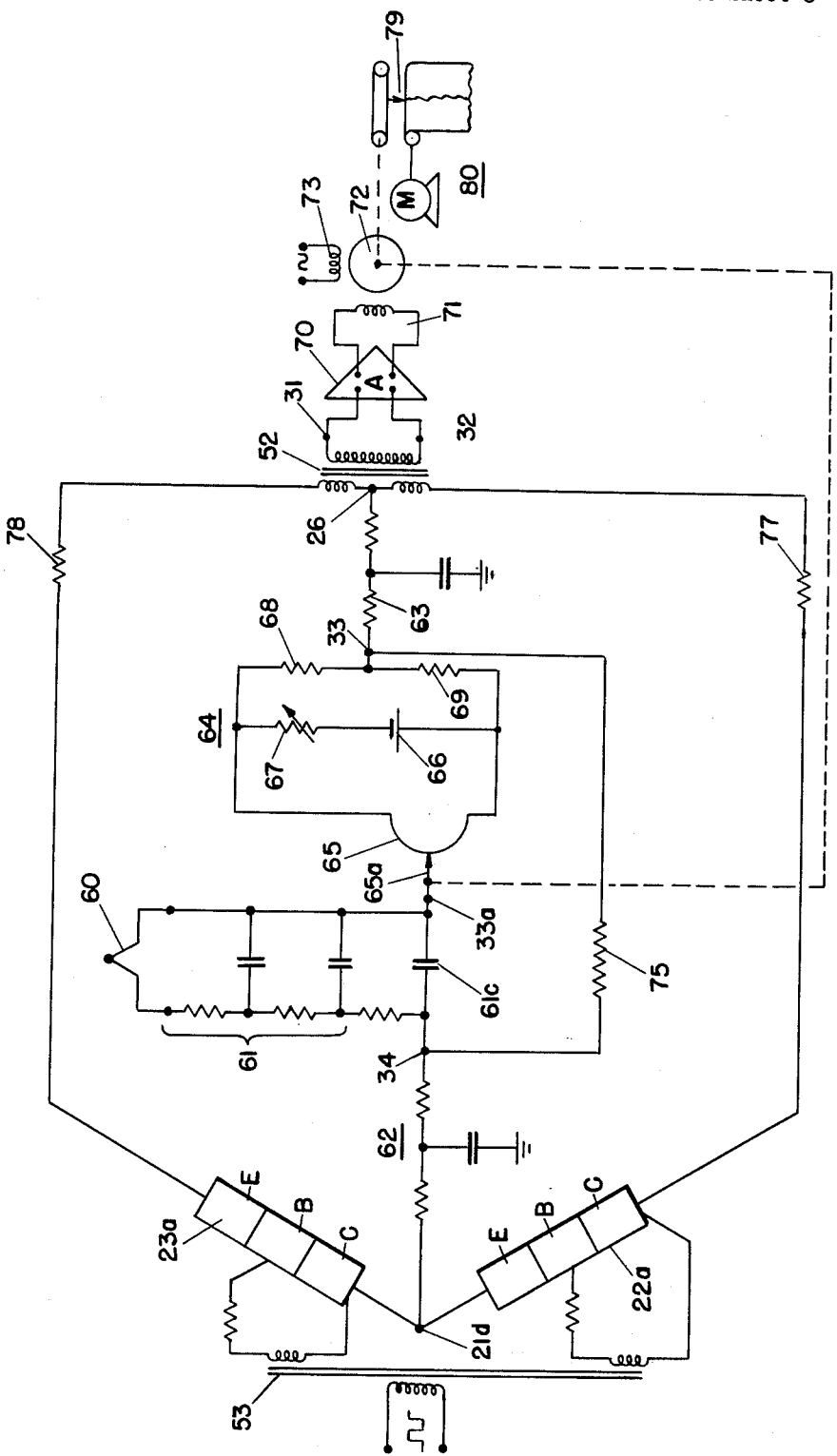
FIG. 3 is a wiring diagram schematically illustrating the invention applied to a measuring system of the balanceable type.

Referring now to FIG. 3, the converter 21a of FIG. 2 has been illustrated in a measuring system for an unknown source of direct current, such as developed by a thermocouple 60. The unknown voltage developed by the thermocouple is applied to the external direct current terminals 33a and 34 by way of a three-section input filter 61. Between the point 21d and the direct current terminal 34 is an RF filter 62 comprising two series resistors with a capacitor extending from their mid-point to ground. Between the terminal 33 and point 26 is a second RF filter 63 identical with filter 62. A potentiometer 64 including a variable resistor 65 with associated contact 65a is supplied from a battery 66 through a rheostat 67. The terminal 33 is connected to the mid-point between a pair of series resistors 68 and 69 connected in parallel with slidewire resistor 65 and contact 65a to point 33a. The transformer 52 has its secondary winding connected to the external alternating current circuit at terminals 31 and 32 and thence to the input of an amplifier 70 which supplies the control winding 71 of a motor 72 having a power winding 73 energized from an alternating current source having the same frequency as the source for the square-wave voltage applied to the primary winding of control transformer 53. The motor is energized for rotation in a direction to change the positions of slidewire 65 and its contact 65a relative to each other to balance the voltage developed by the thermocouple 60.

As well understood by those skilled in the art, the filter 61 including a terminating capacitor 61c is effective to produce damping of the motor 72 by an amount which varies with the speed of that motor, more particularly, with the speed of relative adjustment between contact 65a and slidewire 65. In order to provide an adequately low impedance for the detector circuit as between direct current terminals 33 and 34, a shunting resistor 75 is provided, which in one application had a value of 2,000 ohms.

In the system of FIG. 3, with silicon transistors 22a and 23a dissimilar in the magnitude of the voltage offset, it was found that in the absence of provisions now to be described there was produced a charging of capacitor 61c first in one direction and then in the opposite direction. The result was the development at the input of amplifier 70 of an unwanted signal of a frequency of 120 cycles per second, twice that of the frequency of the alternating current applied to the power winding 73, and twice that of the square-wave alternating current control signal applied to transformer 53. This unwanted 120-cycle signal caused overloading of the amplifier and slow response as a result of reduced torque gradient of the motor. The effect of the unwanted signal was effectively suppressed or eliminated by providing transformer 52 with more turns so giving the primary winding thereof a higher impedance. Thus, the turns ratio of transformer 52 was then of the order of one-to-one. The undesired 120-cycle signal was further suppressed by including in series with the transistors 22a and 23a resistors 77 and 78 respectively of 10,000 ohms.

In FIG. 3 the potential tap or connection to the respective collectors of transistors 22a and 23a is shown separate and apart from the conductors extending from each transistor and forming part of the bridge of the converter. While the separate connection may in some instances be preferred it is not essential. When used, it will reduce the voltage offset introduced by the transistors. Since this voltage offset is in any event removed in its effect on either external circuit, it can be understood why the division in connections to the collectors need not always be utilized.

With the system of FIG. 3 arranged as described, the thermocouple 60 responds to changes in temperature to apply a corresponding change in voltage to the input circuit including the filter 61. The transistors 22a and 23a are alternately rendered conductive in manner described above to convert any difference between the direct current voltage from thermocouple 60 and that developed between contact 65a and terminal 33 of potentiometer 64 into an alternating current voltage. The alternating current output voltage thus appearing at terminals 31 and 32 is applied to the amplifier 70 which energizes the motor 72 for movement of contact 65a of slidewire 65 to restore balance to the system. In restoring balance to the system, the motor 72 drives a pen index 79 of an indicator-recorder 80 shown as including the chart driven by a constant speed motor. The indication by the exhibiting instrument 80 of the temperature of thermocouple 60 is unaffected by voltage and current offset of either of transistors 22a and 23a and for the reasons explained in connection with FIG. 2.

While in the modification of FIG. 3 the frequency applied to the power winding 73 and to the primary winding of transformer 53 has been assumed to be 60 cycles per second, it is to be understood that the use of the transistor-type of converter removes any limitation in respect to frequency of operation as compared with the frequency limitations inherent in the use of converters of the mechanical or vibrating type. Thus converters, a term used here generically to describe devices for converting direct current to alternating current and to describe devices for demodulating or converting alternating current to direct current, have many uses where frequencies far in excess of 60 cycles per second may with advantage be utilized. Operation at the higher frequencies is advantageous since not affected by stray fields of 60 cycle per second character. Filter components for the higher frequencies may be small as compared, for example, with the input filter 61 which has capacitors of 8 microfarads each, with resistances of 2,000 ohms. each designed for sixty cycle operation.

The principles of the invention having now been explained together with several exemplary modifications thereof, it is to be understood that many more modifications may be made all within the spirit and scope of the appended claims.

What is claimed is:

1. A full-wave converter comprising a bridge circuit having first and second transistors respectively in two adjacent arms, an impedance element in each of the remaining arms, control circuits respectively connected to control electrodes of said transistors for controlling their conductivity, means for applying an alternating control voltage to each of said control circuits for cyclically rendering said first transistor conductive and said second transistor non-conductive and for then rendering said second transistor conductive and said first transistor non-conductive, an external direct current circuit effectively connected across one diagonal of said bridge, an external alternating current circuit effectively connected across the opposite diagonal of said bridge, said transistors having a voltage offset characteristic which in the absence of an input signal from either of said external circuits produces across one diagonal of said bridge an alternating current voltage and across the opposite diagonal of said bridge a direct current voltage, said external direct current circuit being connected across the diagonal at which said alternating current voltage appears due to said offset and said external alternating current circuit being connected across said diagonal at which said direct current voltage appears due to said offset.

2. The converter of claim 1 in which there is provided means for rendering said transistors alternately conductive in synchronism with the frequency of an alternating current input signal applied to said external alternating current circuit.

3. The converter of claim 1 in which said external alternating current circuit includes a transformer having its secondary winding connected across a diagonal of the bridge including a point common to said two transistors.

4. The converter of claim 1 in which said external direct current circuit is connected across a diagonal of the bridge, one point of which diagonal is common to said two transistors.

5. The converter of claim 4 in which said two transistors are of the same type, the emitter of one of them being connected to said common point, and the collector of the other of them being connected to said common point.

6. The converter of claim 5 in which said alternating current circuit effectively connected across the opposite diagonal of the bridge comprises a pair of windings of a transformer, said windings comprising said impedance elements in said opposite arms of said bridges.

7. The converter of claim 5 in which said alternating current circuit effectively connected across the opposite diagonal of the bridge comprises a pair of windings of a transformer, said windings comprising said impedance elements in said opposite arms of said bridge, and resistors in series with said transistors in said bridge.

8. A full-wave converter comprising a bridge circuit having first and second transistors respectively in two adjacent arms, an impedance element in each of the remaining arms, control circuits respectively connected to control electrodes of said transistors for controlling their conductivity, means for applying an alternating control voltage to each of said control circuits for cyclically rendering said first transistor conductive and said second transistor non-conductive and for then rendering said second transistor conductive and said first transistor non-conductive, an external direct current circuit effectively connected across one diagonal of said bridge, an external alternating current circuit effectively connected across the opposite diagonal of said bridge, said transistors having an offset characteristic which in the absence of an input signal from either of said external circuits produces across one diagonal of said bridge an alternating current voltage and across the opposite diagonal of said bridge a direct current voltage, one of said transistors producing around said bridge an effect of offset in a given direction and said other transistor producing around said bridge an effect of offset in a given direction, said external direct current circuit being connected across the diagonal of said bridge which includes the common connection to said transistors when the effects of offset around said bridge from said transistors are in the same direction and said direct current circuit being connected across the diagonal of said bridge which does not include a common connection to said transistors when the effects of offset around said bridge by said transistors are in opposite directions and said external alternating current circuit being connected across the opposite diagonal of said bridge.

9. A full-wave converter, comprising a bridge circuit having first and second transistors respectively in two adjacent arms, an external alternating current circuit having a plurality of windings, a separate one of said windings being connected in each of the remaining two arms of said bridge, control circuits respectively connected to control electrodes of said transistors for controlling their conductivity, means for applying an alternating control voltage to each of said control circuits for cyclically rendering said first transistor conductive and said second transistor non-conductive and for then rendering said second transistor conductive and said first transistor non-conductive, an external direct current circuit effectively connected across a diagonal of said bridge, one point of which diagonal is common to said two transistors, the other point of which diagonal is common to said two windings in said remaining two arms of said bridge, said transistors having a voltage offset characteristic which in the absence of an input signal from either of said external circuits produces across said diagonal an alternating current voltage and across said two windings in said remaining two arms a direct current voltage.

10. The converter of claim 9 in which said two transistors are of the same type, the emitter of one of them and the collector of the other of them being connected to said point common to said two transistors.

References Cited in the file of this patent
UNITED STATES PATENTS

| | | |
|---|---|---|
| 2,783,384 | Bright et al. | Feb. 26, 1957 |
| 2,821,639 | Bright et al. | Jan. 28, 1958 |
| 2,826,731 | Paynter | Mar. 11, 1958 |
| 2,849,614 | Royer et al. | Aug. 26, 1958 |
| 2,888,627 | Kompelien et al. | May 26, 1959 |